United States Patent
Prust et al.

[11] Patent Number: 6,040,557
[45] Date of Patent: *Mar. 21, 2000

[54] DROP-IN AIR HEATER FOR AN ENGINE WITH HEATER SUPPORT FRAME HAVING PRONGS ENGAGING HEATER HOLDERS

[75] Inventors: Andrew J. Prust, Coon Rapids; Jan P. Thimmesch, Eden Prairie, both of Minn.

[73] Assignee: Phillips & Temro Industries Inc., Eden Prairie, Minn.

[ * ] Notice: This patent is subject to a terminal disclaimer.

[21] Appl. No.: 09/248,510

[22] Filed: Feb. 10, 1999

Related U.S. Application Data

[63] Continuation-in-part of application No. 09/209,388, Dec. 10, 1998.

[51] Int. Cl.[7] .................................................. F02M 31/12
[52] U.S. Cl. .......................... 219/206; 219/537; 123/549
[58] Field of Search .................................... 219/206, 536, 219/537, 523, 532, 520; 123/549; 392/350, 371, 379, 485

[56] References Cited

U.S. PATENT DOCUMENTS

| | | | |
|---|---|---|---|
| 533,795 | 2/1895 | Edwards | 219/532 |
| 1,188,972 | 6/1916 | Moffat | 219/532 |
| 1,647,346 | 11/1927 | Ehrgott | 219/532 |
| 2,177,840 | 10/1939 | Roualet . | |
| 2,320,528 | 6/1943 | Loeffler et al. | 219/206 |
| 3,811,031 | 5/1974 | McBride et al. | 392/350 |
| 3,851,147 | 11/1974 | Hachmeister | 392/350 |
| 4,463,721 | 8/1984 | Hayashi et al. . | |
| 4,512,322 | 4/1985 | Barcy | 123/549 |
| 4,685,437 | 8/1987 | Tanaka et al. . | |
| 5,595,164 | 1/1997 | Thimmesch . | |
| 5,743,242 | 4/1998 | Thimmesch . | |
| 5,887,575 | 3/1999 | Thimmesch et al. | 123/549 |

FOREIGN PATENT DOCUMENTS

| | | | |
|---|---|---|---|
| 1256376 | 12/1967 | Germany | 219/532 |
| 62-91649 | 4/1987 | Japan . | |
| 7-217508 | 8/1995 | Japan . | |
| 2067245 | 7/1981 | United Kingdom . | |

Primary Examiner—John A. Jeffery
Attorney, Agent, or Firm—Harness, Dickey & Pierce, P.L.C.

[57] ABSTRACT

An air intake for an internal combustion and a heater for use in the air intake includes a mounting flange, a frame coupled to the mounting flange and having a pair of opposed upright walls each defining an upstream face and a downstream face relative to a direction of airflow, a heating element assembly, and coupling means located on or between the upstream and downstream faces for connecting the heating element assembly to the frame and limiting movement of the heating element assembly relative to the frame.

18 Claims, 8 Drawing Sheets

DROP-IN AIR HEATER FOR AN ENGINE WITH HEATER SUPPORT FRAME HAVING PRONGS ENGAGING HEATER HOLDERS

This is a continuation-in-part of U.S. patent application Ser. No. 09/209,388, filed Dec. 10, 1998 entitled Drop-In Air Heater.

BACKGROUND OF THE INVENTION

1. Technical Field

The invention generally relates to an apparatus for heating the air/fuel mixture entering the cylinders of an internal combustion engine. More particularly, the invention relates to an electric heater adapted for mounting within the air intake system of an engine.

2. Discussion

The air/fuel mixture entering the cylinders of an internal combustion engine is commonly heated to increase fuel economy and responsiveness to starting as well as to decrease pollutant discharge. One type of intake heating device generally includes a housing or frame disposed between a carburetor and an air intake manifold. Another type of intake heating device is mounted within an open cavity of an intake manifold. After this second type of heating device is mounted on the intake, the heater and intake subassembly is subsequently mounted to an engine. In the aforementioned devices, current is passed through a heating coil or grid to increase the temperature of the surrounding air as it passes into a combustion chamber.

While the aforementioned heaters generally address cold starting and fuel economy issues, other concerns remain. For example, access to the prior art heaters is obtained only after the intake manifold is removed from the engine. Retrofitting an existing vehicle not originally equipped with a heater is similarly difficult. In addition, prior art heaters have been specifically constructed to package within a given geometry and function only with a certain power system. As a result, many heater components were proliferated in order to meet varying customer needs.

Accordingly, in view of the above concerns as well as the manufacturer's ever present desire to reduce manufacturing costs and complexity, a need exists for a drop-in heater that may be installed without removing the intake manifold. Similarly, a need exists for an intake heater that may be easily modified to function with different power systems.

SUMMARY OF THE INVENTION

Accordingly, the present invention is directed to a heater for use in an intake tube of an internal combustion engine. More particularly, the heater includes a mounting flange, a frame coupled to the mounting flange and having a pair of opposed upright walls each defining an upstream face and a downstream face relative to a direction of airflow, a heating element assembly, and coupling means located on or between the upstream and downstream faces for connecting the heating element assembly to the frame and limiting movement of the heating element assembly relative to the frame.

BRIEF DESCRIPTION OF THE DRAWINGS

Other objects and advantages of the invention will become apparent to one skilled in the art upon reading the following specification and subjoined claims and upon reference to the drawings in which:

DETAILED DESCRIPTION OF THE PREFERRED EMBODIMENTS

The application described and illustrated herein is directed to an air heating device for use in an internal combustion engine. More particularly, the heating device includes a housing assembly that retains a heating element and heating element holders in a predetermined position relative to the housing. The housing includes retention tabs on a U-shaped bracket that are positioned both radial to the airflow as well as on both sides of the bracket to retain ceramic elements of the holder. The air heater and housing device provide numerous advantages over heaters known in the art including the ability to provide twelve or twenty-four volt embodiments of the invention with only minor hardware changes, taking advantage of the intake housing to secure the resistance ribbon and holders in place on the intake side of the heater element, use of retention tabs on the engine side and radial to the airflow for secure yet simple retention of the heating element and holders within the housing, and use of a mounting plate to seal the insertion area of the intake system.

In addition to the above advantages, the present invention provides an air heater that is integratable into the air intake system of a diesel engine and, more particularly, within a ninety degree (90°) elbow of the air intake tube. This unique configuration of the air heater, including the heater housing, provides enhanced startability of the diesel engine notwithstanding the restrictive location for the heater. The design also provides improved mounting flexibility over traditional bolt-on heater designs.

The drop-in air heater of the present invention will now be described in greater detail with reference to FIGS. 1–4. Specifically, as shown in FIGS. 1–4, drop-in heater 10 includes a mounting flange 16 which is connectable to an air intake tube 13 (FIG. 4) of the vehicle engine such as through apertures 17 formed therein. As will be described in detail below, mounting flange 16 further serves to seal the engine intake passage from the environment surrounding the engine compartment.

Figure 1:
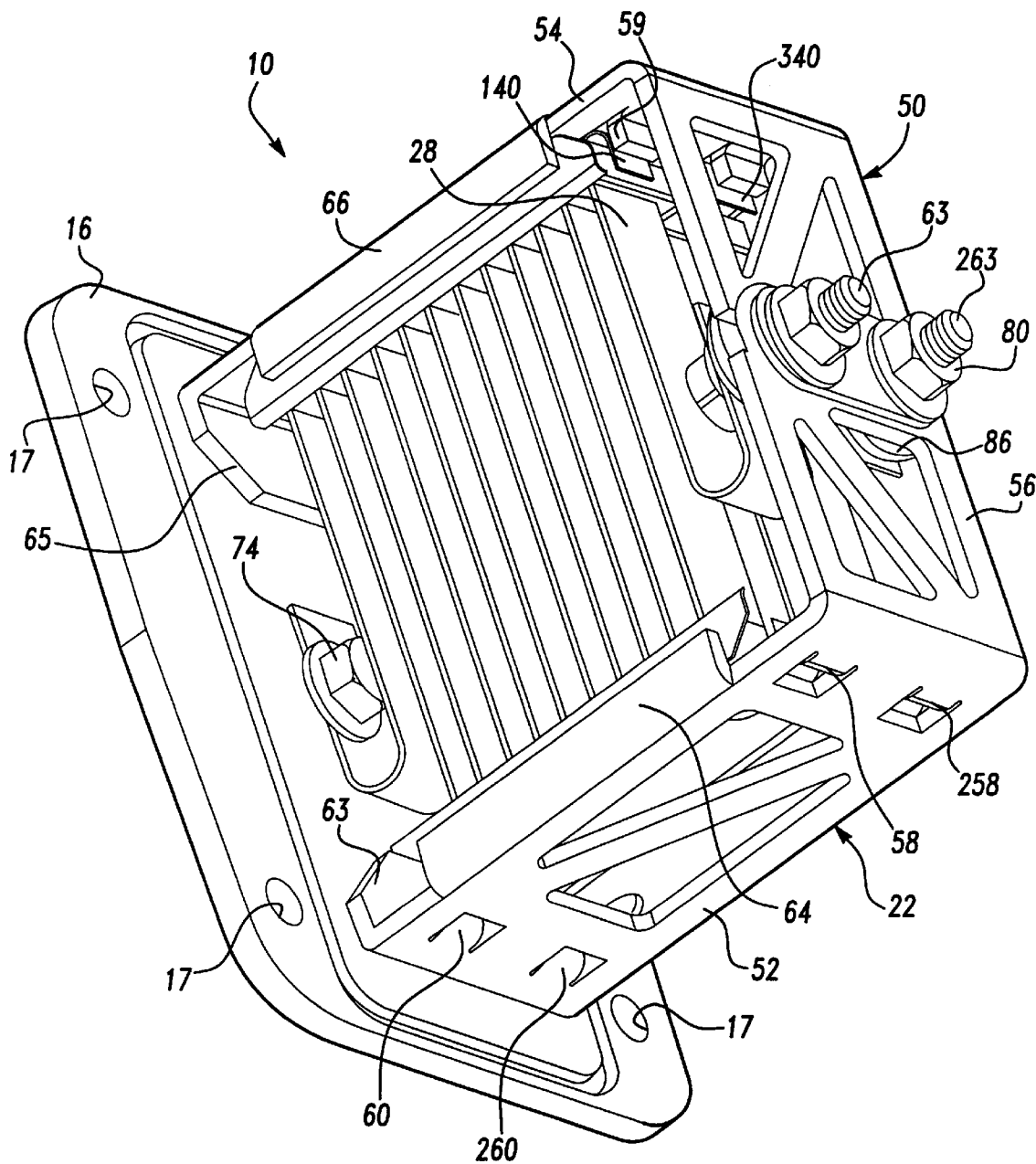
FIG. 1 is a perspective view of a drop-in heater of the present invention.
Figure 2:
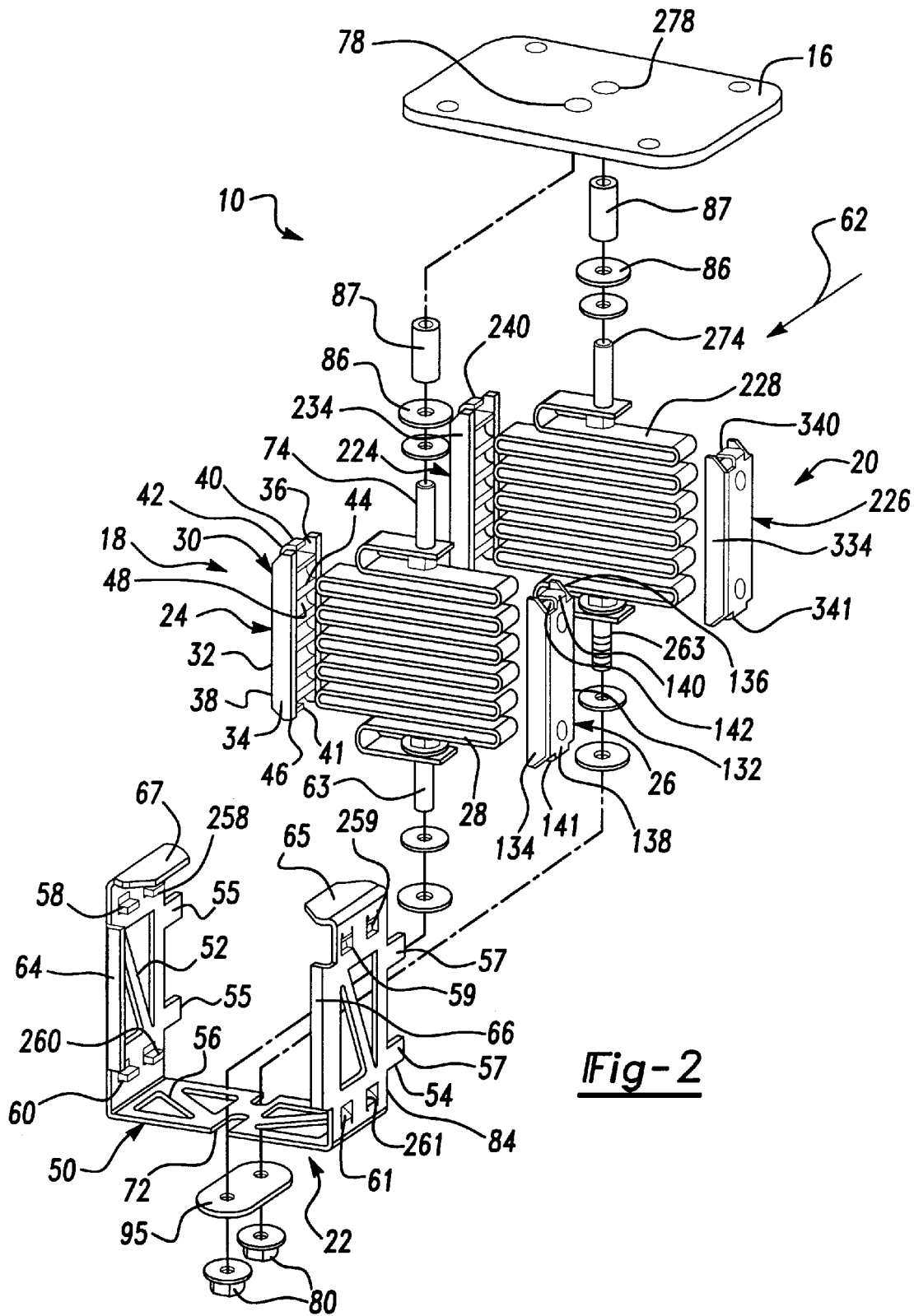
FIG. 2 is an exploded perspective view of the drop-in heater.

As best illustrated in FIGS. 1 and 2, heater 10 further includes a first heater module 18, a second heater module 20, and a U-shaped frame 22. First heater module 18 includes a first holder 24, a second holder 26, and a serpentine heating element 28. First holder 24 includes a housing 30 preferably shaped from a stainless steel sheet. Housing 30 defines a "C" shaped channel 32 bounded on three sides by opposed side walls 34 and 36 and end wall 38. Housing 30 includes tabs 40 and 41 protruding from the terminal ends of end wall 38.

Wave springs 42, also preferably formed of stainless steel, are disposable within channel 32 to engage end wall 38. Thermal and electric insulators 44 are disposable within channel 32 to engage and capture springs 42 between end wall 38 and insulators 44. Those skilled in the art will appreciate that wave springs 42 urge insulators 44 away from end wall 38 and into engagement with stops 46 which extend inwardly into channel 32 from side walls 34 and 36. Insulators 44 include cavities 48 to accommodate and position heating element 28 therewithin. It is contemplated that insulators 44 may be formed of a ceramic material known in the art to provide the desired thermal and electrical insulating properties.

As shown in FIGS. 1 and 2, second holder 26 is configured substantially the same as first holder 24. Those skilled in the art will appreciate that the configuration and interrelation of side walls 134 and 136, channel 132, tabs 140 and 141, wave springs 142, insulators 144, stops 146, and cavities 148, are substantially the same as the corresponding components described with reference to FIG. 2.

As shown in FIG. 2, second heater module 20 is configured substantially the same as first heater module 18. Accordingly, the components of second heater module 20 are referred to herein by numerals increased by 200 relative to the numbers used to describe first heater module 18.

Figure 2A:
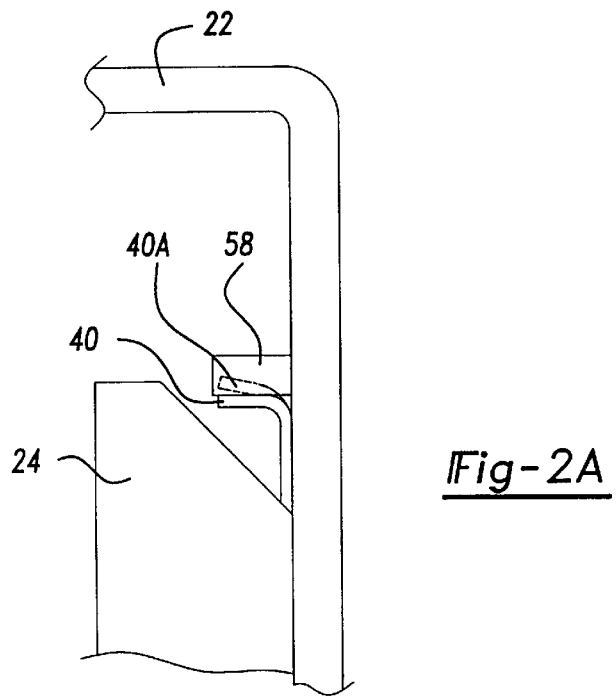
FIG. 2A is a partial perspective view of the drop-in heater.

Frame 22 defines a "U" shaped channel 50 bounded on three sides by upright walls 52 and 54 and bottom 56. Upright wall 52 includes inwardly protruding prongs 58, 60, 258 and 260, finger 67, tangs 55, and stop 64 while upright wall 54 includes inwardly protruding prongs 59, 61, 259 and 261, finger 65, tangs 57, and stop 66. Upon installation of first heater module 18 into frame 22, tabs 40 and 41 of first holder 24 cooperate with prongs 58 and 60 to securely retain first holder 24 between prongs 58 and 60. Specifically, tabs 40 and 41 are biasedly deformed to engage prongs 58 and 60 such that first holder 24 is forced toward second holder 26. In FIG. 2A, tab 40 is shown biasedly loaded against prong 58. A broken line representation of tab 40 is also presented as 40A to depict the position of the tab 40 prior to engagement with the prong 58. Similarly, tabs 140 and 141 of second holder 26 are biasedly deformed to engage prongs 59 and 61 as illustrated in FIG. 1. Accordingly, the bias force generated by tabs 40, 41, 140 and 141 is counteracted by the urging of wave springs 42 and 142 such that first heater module 18 is secured in a direction radial to the direction of air flow 62. Those skilled in the art will appreciate that tabs 240 and 241 similarly cooperate with prongs 258 and 260, respectively, while tabs 340 and 341 cooperate with prongs 259 and 261, coupling each holder of second heater module 20 to frame 22.

Figure 4:
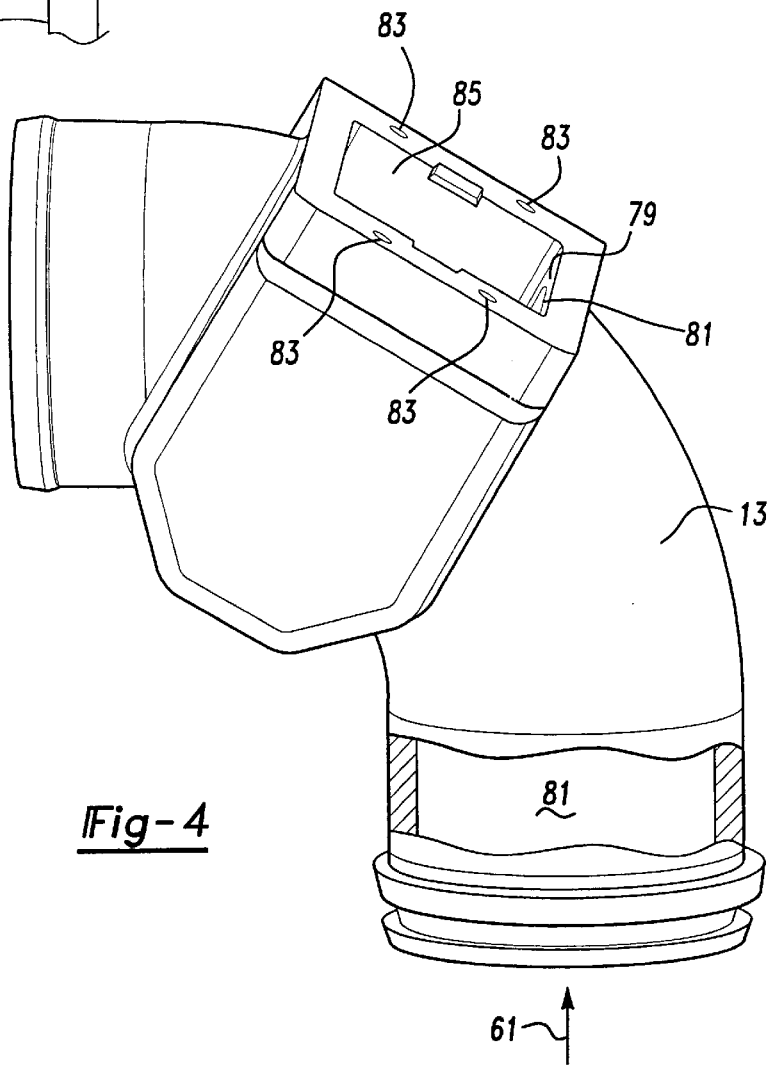
FIG. 4 is a perspective view of an air intake tube.
Figure 3:
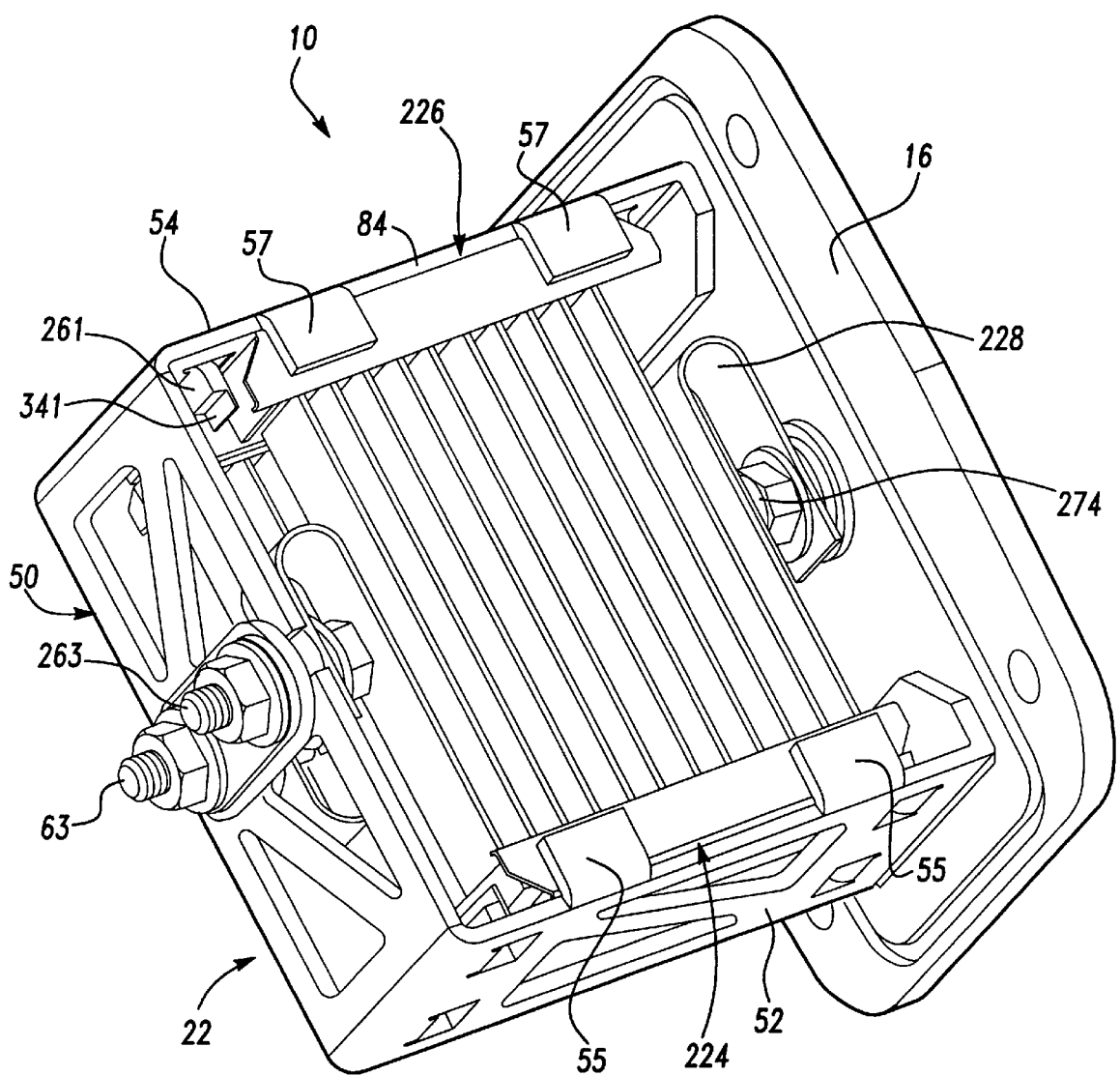
FIG. 3 is a perspective view of the drop-in heater from a different angle.

To assemble drop-in heater 10, first heater module 18 and second heater module 20 are positioned relative to frame 22 and flange 16 as shown in FIG. 2. Fingers 65 and 67 are coupled to frame 22 using a conventional attachment process such as welding, riveting, gluing, or bolting. First heater module 18 and second heater module 20 are positioned within frame 22 whereupon stops 64 and 66 prevent first heater module 18 from moving in the direction of air flow 62 by contacting side walls 34 and 134 of first and second holders 24 and 26. Similarly, second heater module 20 is prevented from traveling axially along the direction of air flow 62 because holders 224 and 226 are in contact with first and second holders 24 and 26. Once first heater module 18 and second heater module 20 are positioned within frame 22, tangs 55 and 57 are folded inwardly to retain the heater modules as shown in FIG. 3. As shown in FIG. 4, air intake tube 13 includes a land 79 that cooperates with an edge 84 (FIG. 2) of frame 22 to further restrict axial movement of the heater modules in a direction opposite to the direction of air flow 62.

A first embodiment of drop-in heater 10 for use in a twelve-volt power system is hereinafter described. Referring to first heater module 18 as shown in FIG. 2, a bolt 63, with appropriate insulating spacer 86, is disposed through a first slot 70 in heating element 28 and a slot 72 in frame 22. In similar fashion, a bolt 74 is disposed through a second slot 76 in heating element 28 and an aperture 78 in flange 16. One skilled in the art will appreciate that second heater module 20 is coupled to flange 16 and frame 22 in a substantially similar manner as first heater module 18. Accordingly, like components have been identified with reference numerals increased by 200.

Drop-in heater 10 may now be handled and/or shipped separately to an end user for assembly into an engine. As shown in FIGS. 1 and 4, air intake tube 13 defines an air passage 81, fastener apertures 83 and a cavity 85. Air heater 10 is positioned within cavity 85 in heat transfer relation to air passage 81. Standard fasteners (not shown) are positioned within flange apertures 17 and fastener apertures 83 to couple flange 16 to air intake tube 13. In addition, flange 16 seals cavity 85 and air passage 81 from the engine compartment and contamination. Those skilled in the art will appreciate that air heater 10 may be positioned at any point along the air induction system and that the location drawn and described is merely exemplary.

Figure 8:
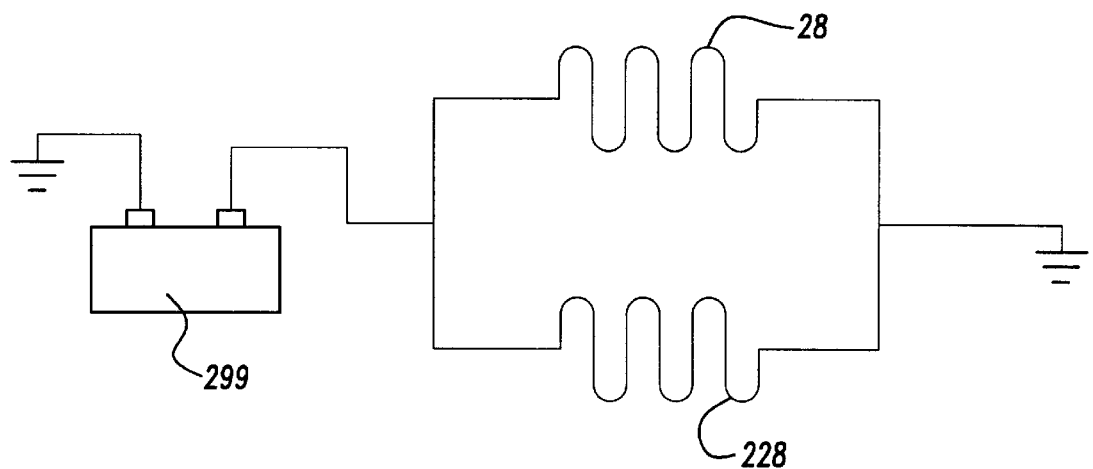
FIG. 8 is an electrical schematic representative of an embodiment of the present invention.

Heating element 28 is formed of an electrically resistant material that generates heat when connected to a power source as hereinafter described. Because the first embodiment of drop-in heater 10 utilizes a twelve-volt power supply 299, heating elements 28 and 228 are electrically connected in parallel as shown in FIG. 8. Accordingly, as best seen in FIG. 2, bolts 63 and 263 are both mechanically and electrically coupled to frame 22 by connecting plate 95 and nuts 80. Frame 22 is electrically coupled to mounting flange 16 which is electrically coupled to ground via the engine of the vehicle. In order to direct the flow of electricity through heating element 28, bolts 74 and 274 are electrically insulated from flange 16 by insulating sleeves 87 and insulating spacers 86. Finally, bolts 74 and 274 are electrically connected to a power source for communicating current to heating element 28.

Figure 5:
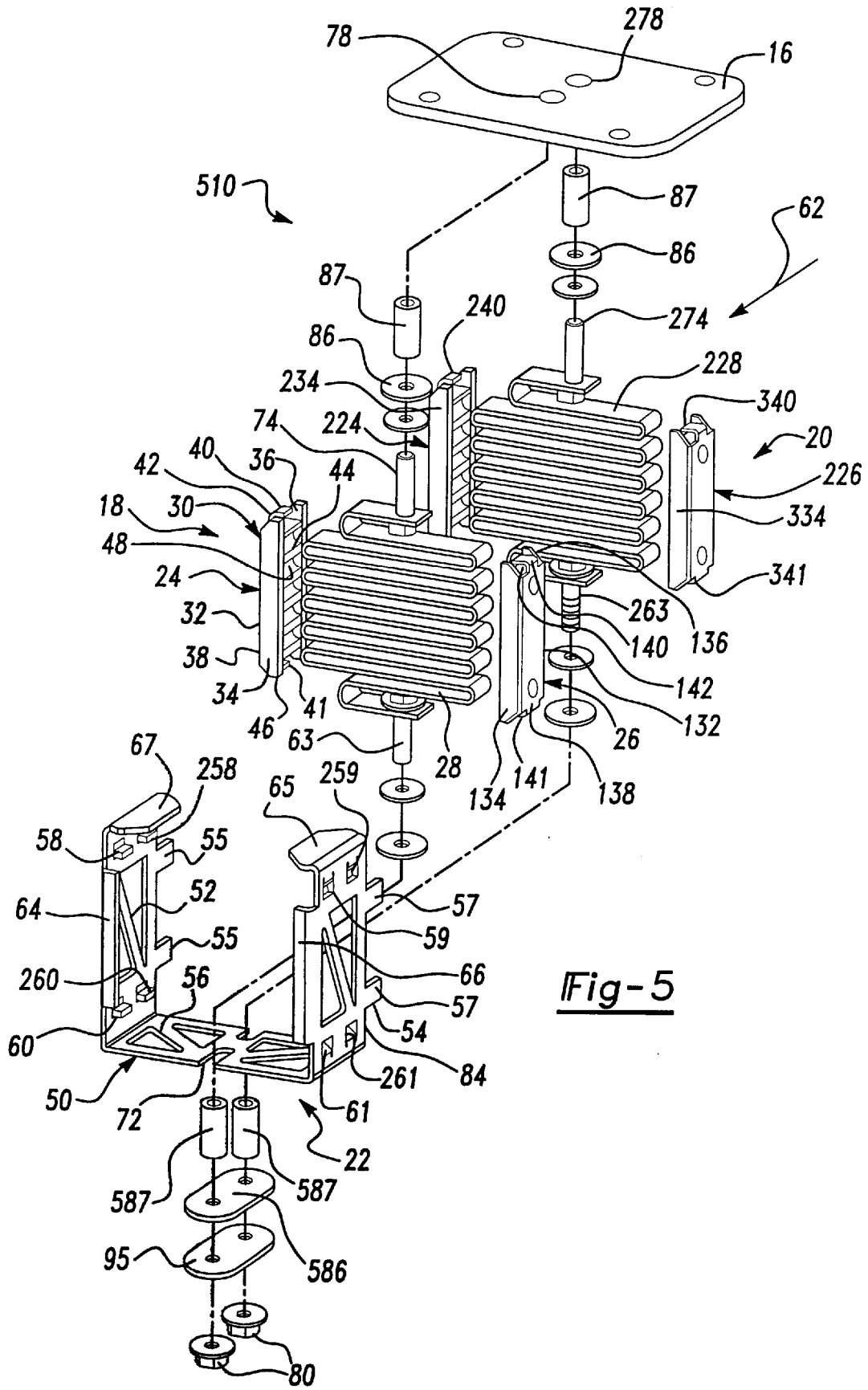
FIG. 5 is an exploded view of a second embodiment of the drop-in heater.

A second embodiment of the present invention constructed to cooperate with a 24 volt power supply is shown in FIG. 5. The function of the components of this embodiment are essentially the same as those previously described in FIGS. 1–4. Accordingly, those skilled in the art will appreciate that drop-in heater 510 provides the advantages previously discussed herein. For clarity, only those components that have been modified or added to create a 24 volt heater begin with numerals increased by 500.

Figure 9:
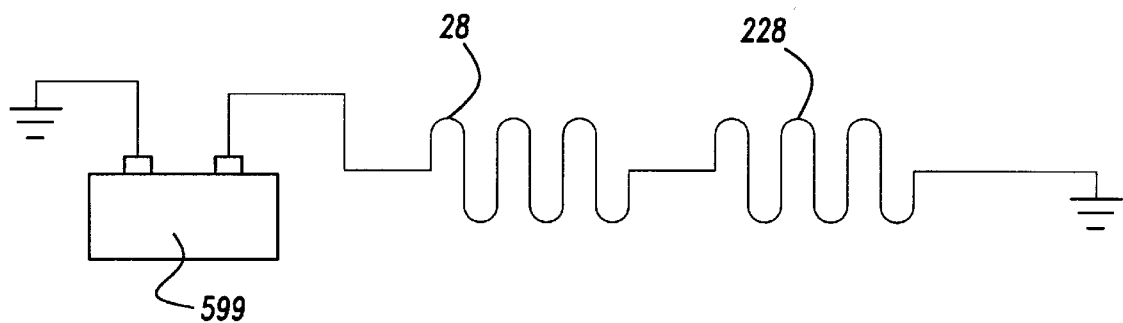
FIG. 9 is an electrical schematic representative of an another embodiment of the present invention.

The 24 volt version of drop-in heater 510 differs from the 12 volt heater in manner of internal electrical connection only. Specifically and in order to utilize a 24 volt power supply 599, heating elements 28 and 228 are electrically connected in series as shown in FIG. 9. Accordingly, both bolt 63 and bolt 263 are electrically coupled to one another but electrically insulated from frame 22. Insulating spacer 586 is positioned between frame 22 and conductive connector plate 95 to accomplish the task of insulating frame 522 while connector plate 95 electrically couples bolts 63 and 263. To complete the series circuit, one of bolts 74 and 274 is electrically connected to power while the other is electrically connected to ground. Each bolt 74 and 274 is electrically insulated from the other and also from flange 16.

One skilled in the art will appreciate that the aforementioned series circuit may be constructed in a variety of ways. For example, instead of insulating both bolts 74 and 274 from flange 16 as shown in FIG. 5, one set of insulators 86 and 87 may be removed from one of the bolts to allow current to ground through flange 16. Accordingly, the only bolt requiring a separate electrical connection would be the positive bolt utilizing the insulators.

Figure 6:
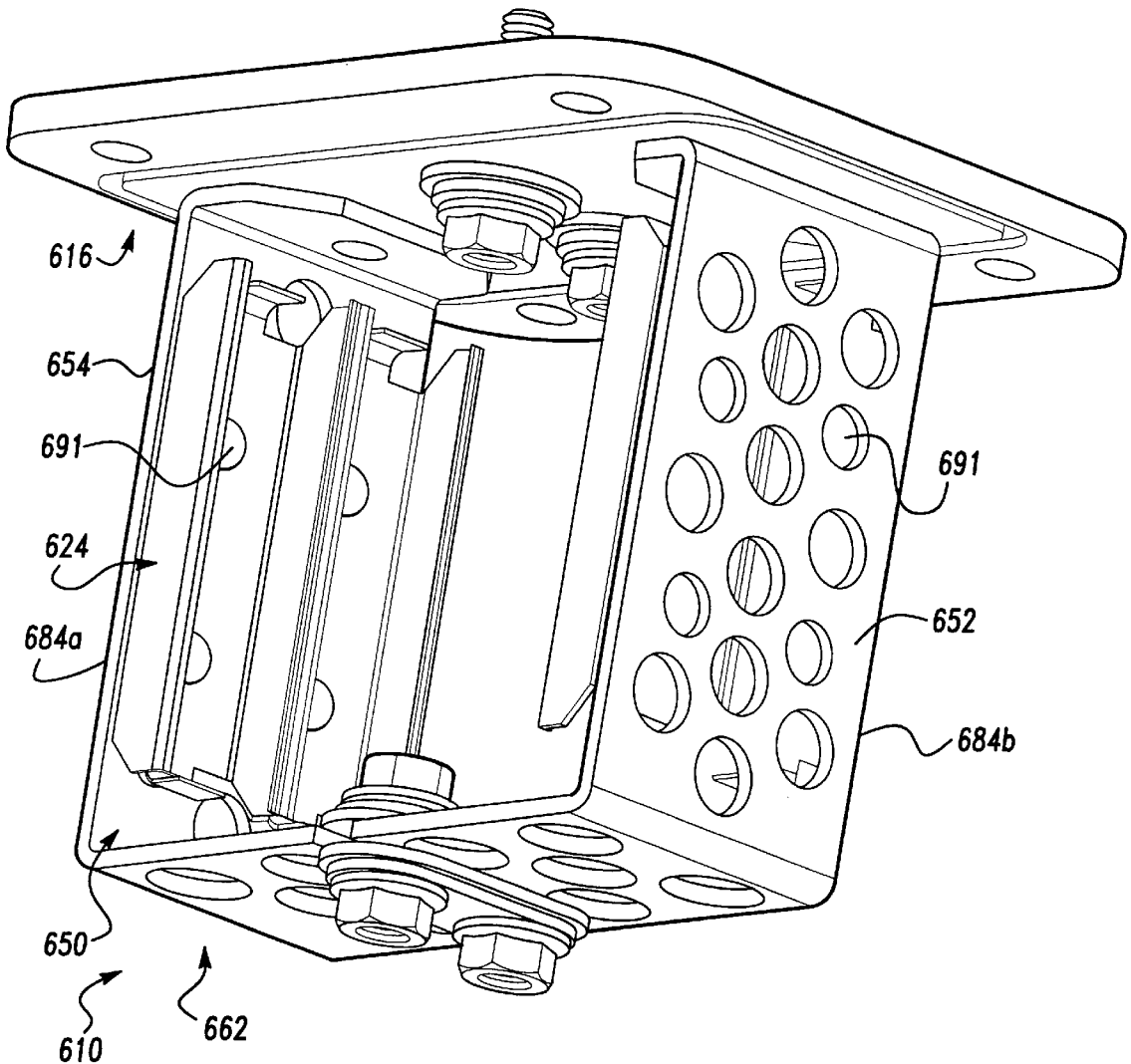
FIG. 6 is a perspective view of a third embodiment of the drop-in heater.
Figure 7:
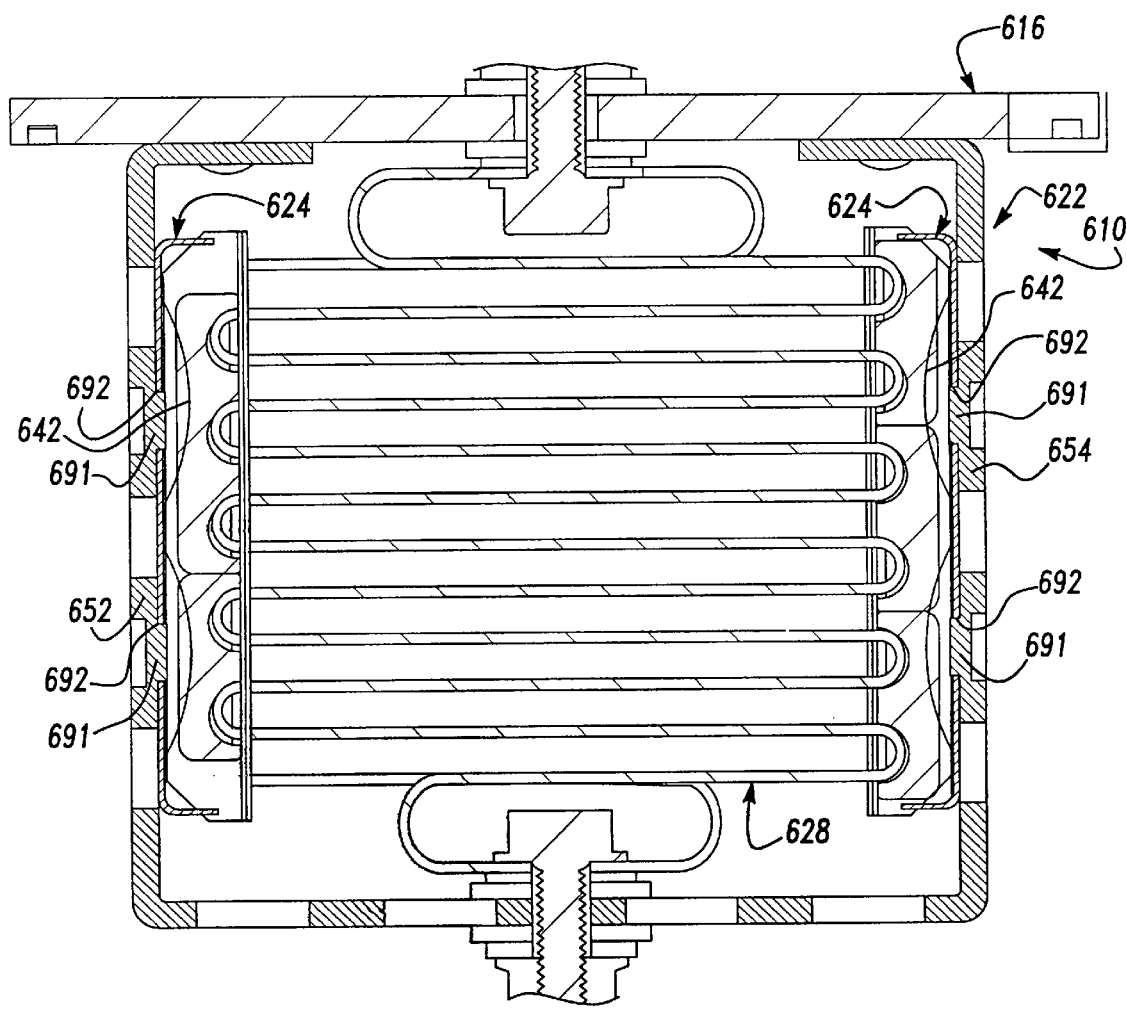
FIG. 7 is a sectional view of the third embodiment of the drop-in heater.

A third embodiment of a drop-in heater according to the present invention is illustrated in FIGS. 6 and 7. The heater 610 is shown to include a flange 616, frame 622, and holders 624 substantially the same as those described above with reference to FIGS. 1–5. For purpose of clarity, the heater is illustrated in FIG. 6 without the serpentine heating elements and insulators described above. However, those skilled in the art will appreciate that when completely assembled, heater 610 does include these elements as shown in FIG. 7. The principle difference between the heater 610 and those described above is the use of half-shear projections 691 in the upright side walls 652 and 654 that cooperate with appropriately sized apertures 692 (FIG. 7) in the holders 624 to align and limit movement of the holders relative to the frame. As a result, the mechanism for coupling the holders to the frame is contained within the boundaries of the frame itself, i.e., between the upstream and downstream side faces 684a and 684b, respectively, of the upstanding side walls 652 and 654, thereby reducing the overall size of the heater. Additionally, assembly of the heater to the air intake tube 13 (FIG. 4) is facilitated by eliminating the elements that project beyond the upstanding side walls of the frame.

It is preferred that the half-shear projections are slightly smaller than the corresponding apertures in the holders. This size difference allows the holders to be moved slightly relative to the frame in order to properly align the heating element assemblies within the frame during assembly. It should be appreciated that the wave springs 642 in combination with the heating elements 628 (FIG. 7) urge the holders 624 against the side walls thereby maintaining the coupling engagement between the projections 691 and apertures 692.

In the illustrated embodiment, the projections are formed by half-shearing. More particularly, a circular projection is formed by inserting a circular shearing punch approximately halfway through the thickness of the upstanding side wall. The half-shear projection has been found to provide a sufficient projection distance to adequately secure the holders to the upstanding side walls while maintaining the structural connection between the projection and the side wall. Those skilled in the art will appreciate that the proportional depth of the projection relative to the thickness of the upstanding side wall may be varied, as can the configuration of the projections, without departing from the scope of the invention as defined by the appended claims. Moreover, while the illustrated embodiment shows two (2) projections and corresponding apertures to couple each holder to the upstanding side walls, a different number or orientation of projections and apertures may be used.

Those skilled in the art will appreciate that the use of the projections to orient and couple the heating element holders 624 to the frame 622 eliminates the need for coupling mechanisms external to the frame footprint and, more particularly, with reference to the heater embodiments described in FIGS. 1–5, eliminate the need for stops and/or tangs extending from the upstream and downstream faces of the upstanding frame side walls. As a result, the heater 610 of the present invention may be used in even smaller spaces while further eliminating the use of projections that may snag or bind on other components during assembly.

Various other advantages and modifications will become apparent to one skilled in the art after having the benefit of studying the teachings of this detailed description, the attached drawings, and the following claims.

What is claimed is:

1. An air intake for an internal combustion engine, said air intake comprising:

an air intake tube having a passage for communicating air and defining a direction of airflow, the air intake tube including a cavity communicating with the passage; and a heater including:

a mounting flange coupling the heater to the air intake tube and sealing said cavity, said mounting flange defining a plane substantially parallel to said direction of airflow through said heater, a frame coupled to the mounting flange, said frame having a pair of opposed upright walls, said flange and said frame defining a channel for communicating air through said heater, each upright wall having an upstream face and a downstream face relative to said direction of airflow, a heating element assembly in heat transfer relationship with the air passage, and stops extending from one of said upstream and downstream faces of said upright walls to limit movement of said heating element assembly in a first direction within said channel.

2. The air intake of claim 1 further including tangs extending from one of the other of said upstream and downstream faces of said upright frame walls and being movable from an assembly position allowing assembly of said heating element assembly within said channel and an operative position wherein said tangs limit movement of said heating element assembly in a second direction within said channel, said second direction being opposite said first direction.

3. The air intake of claim 1 wherein said stops extend from each of the downstream faces of said upright frame walls and said tangs extend from each of the upstream faces of said upright frame walls.

4. The air intake of claim 1 wherein said stops and said tangs limit movement of said heating element assembly parallel to said upright walls.

5. An air intake for an internal combustion engine, said air intake comprising:

an air intake tube having a passage for communicating air and defining a direction of airflow, the air intake tube including a cavity communicating with the passage; and a heater including:

a mounting flange coupling the heater to the air intake tube and sealing said cavity, said mounting flange defining a plane substantially parallel to said direction of airflow through said heater, a frame coupled to the mounting flange, said frame having a pair of opposed upright walls, said flange and said frame defining a channel for communicating air through said heater, each upright wall having an upstream face and a downstream face relative to said direction of airflow, a heating element assembly in heat transfer relationship with the air passage, and coupling means connected to said upright walls for coupling the heating element assembly to the frame, wherein said coupling means is located between said upstream and downstream faces and wherein said coupling means includes a projection extending from each of said upright frame walls between said upstream and downstream faces thereof and an opening in each of said first and second holders, said projections being disposable in said openings.

6. The air intake of claim 5 wherein said openings are larger than said projections allowing the projections to move a limited distance within said openings.

7. A drop-in heater for use in an air intake of an internal combustion engine, the air intake defining a direction of airflow therethrough, said drop-in heater comprising:
a mounting flange;
a frame coupled to the mounting flange, said frame and said flange defining a channel for communicating air through the heater, said frame having a pair of opposed upright walls, each upright wall having an upstream face and a downstream face relative to said direction of airflow;
a heating element assembly; and stops extending from one of said upstream and downstream faces of said upright walls to limit movement of said heating element assembly in a first direction within said channel.

8. The drop-in heater of claim 7 further including tangs extending from one of the other of said upstream and downstream faces of said upright walls and being movable from an assembly position allowing assembly of said heating element assembly within said channel and an operative position wherein said tangs limit movement of said heating element assembly in a second direction within said channel, said second direction being opposite said first direction.

9. The drop-in heater of claim 8 wherein said stops extend from each of the downstream faces of said upright frame walls and said tangs extend from each of the upstream faces of said upright frame walls.

10. The drop-in heater of claim 8 wherein said heater assembly includes a first heater module having a first holder, a second holder, and a heating element coupled to said first and second holders, said first and second holders each having a pair of opposed side walls, said stops including a first stop engaging one of said side walls of said first holder and a second stop engaging one of said side walls of said second holder, said tangs including a first tang engaging the other of said side walls of said first holder and a second tang engaging the other of said side walls of said second holder when said first and second tangs are in said operative position.

11. The drop-in heater of claim 10 wherein said coupling means further includes prongs extending from said upright walls into said channel, said prongs limiting movement of said first and second holders in a third direction perpendicular to said first direction.

12. The drop-in heater of claim 11 wherein said first and second holders each include a pair of opposed end tabs, said prongs including a plurality of prongs each of which engage one of said end tabs of said first and second holders.

13. The drop-in heater of claim 12 wherein said prongs biasingly deform said tabs to create a biasing force urging said first holder toward said second holder.

14. The drop-in heater of claim 8 wherein said heater assembly includes a first heater module and a second heater module, said first heater module including a first holder, a second holder, and a heating element coupled to said first and second holders, said first and second holders each having a pair of opposed side walls, said second heater module including a third holder, a fourth holder, and a heating element coupled to said third and fourth holders, said third and fourth holders each having a pair of opposed side walls, said stops including a first stop engaging one of said side walls of said first holder and a second stop engaging one of said side walls of said second holder, said tangs including a first tang engaging one of said side walls of said third holder and a second tang engaging one of said side walls of said fourth holder when said first and second tangs are in said operative position.

15. A drop-in heater for use in an air intake of an internal combustion engine, the air intake defining a direction of airflow therethrough, said drop-in heater comprising:
a mounting flange;
a frame coupled to the mounting flange to define a channel for communicating air through the heater, said frame having a pair of opposed upright walls each with an upstream face and a downstream face relative to a direction of airflow;
a heating element assembly; and
coupling means located between said upstream and downstream faces of said upright walls for connecting the heating element assembly to the frame and limiting movement of said heating element assembly relative to said frame, wherein said heating assembly includes a first heater module having a first holder, a second holder, and a heating element coupled to said first and second holders, said first and second holders each having a pair of opposed side walls and an end wall, and wherein said coupling means includes a projection extending from each of said upright walls and an opening in each of said first and second holders, said projections being disposable in said openings.

16. The drop-in heater of claim 15 wherein said openings are larger than said projections allowing the projections to move within said openings.

17. The drop-in heater of claim 15 wherein said openings are in said end walls of said first and second holders.

18. A drop-in heater for use in an air intake of an internal combustion engine, the air intake defining a direction of airflow therethrough, said drop-in heater comprising:
a mounting flange;
a frame coupled to the mounting flange to define a channel for communicating air through the heater, said frame having a pair of opposed upright walls each with an upstream face and a downstream face relative to a direction of airflow;
a heating element assembly; and
coupling means located between said upstream and downstream faces of said upright walls for connecting the heating element assembly to the frame and limiting movement of said heating element assembly relative to said frame, wherein said heater assembly includes a first heater module and a second heater module, said first heater module including a first holder, a second holder, and a heating element coupled to said first and second holders, said first and second holders each having a pair of opposed side walls and an end wall, said second heater module including a third holder, a fourth holder, and a heating element coupled to said third and fourth holders, said third and fourth holders each having a pair of opposed side walls and an end wall, and wherein said coupling means includes a pair of projections extending from each of said upright walls and an opening in each of said first, second, third and fourth holders, said projections being disposable in said openings.

* * * * *